United States Patent [19]

Daugherty et al.

[11] Patent Number: 5,562,743
[45] Date of Patent: Oct. 8, 1996

[54] BINDER ENHANCED REFUSE DERIVED FUEL

[75] Inventors: Kenneth E. Daugherty, Lewisville; Barney J. Venables, Denton, both of Tex.; Oscar O. Ohlsson, Naperville, Ill.

[73] Assignees: University of North Texas, Denton, Tex.; Arch Development Corporation, Chicago, Ill.

[21] Appl. No.: 420,570

[22] Filed: Apr. 12, 1995

Related U.S. Application Data

[62] Division of Ser. No. 110,397, Aug. 23, 1993, abandoned, which is a continuation of Ser. No. 368,184, Jun. 19, 1989, abandoned.

[51] Int. Cl.$^6$ .................................. C10L 5/44; C10L 5/12
[52] U.S. Cl. .................................. 44/589; 44/580; 44/596
[58] Field of Search .......................... 44/552, 580, 589, 44/596

[56] References Cited

U.S. PATENT DOCUMENTS

| | | | |
|---|---|---|---|
| 233,884 | 11/1880 | Smith | 44/580 |
| 237,878 | 2/1881 | Kelly | 44/580 |
| 1,668,660 | 5/1928 | Shimamoto | 44/580 |
| 4,152,119 | 5/1979 | Schulz | 44/452 |
| 4,230,460 | 10/1980 | Maust, Jr. | 44/16 C |
| 4,405,331 | 9/1983 | Blaustein et al. | 44/1 D |
| 4,496,365 | 1/1985 | Lindemann | 44/1 D |
| 4,503,785 | 3/1985 | Scocca | 110/342 |
| 4,517,165 | 5/1985 | Moriarty | 423/244 |
| 4,517,925 | 5/1985 | Mackenzie et al. | 110/103 |
| 4,561,860 | 12/1985 | Gulley et al. | 44/10 R |
| 4,616,574 | 10/1986 | Abrams et al. | 110/343 |
| 4,758,244 | 7/1988 | Harvey et al. | 44/608 |

OTHER PUBLICATIONS

"An Identification of Potential Binding Agents for Densified Fuel Preparation From Municipal Solid Waste: Phase 1 Final Report", Kenneth E. Daugherty, University of North Texas for Argonne National Laboratory, Energy and Environmental Systems Division, Oct., 1986.

"Raw Data for Determining Acid Gases, Trace Metals, and Organics from Cofiring Blends of Coal and Densified Refuse Derived Fuel (dRDF) Interim Report No. 1", Attili, et al., North Texas State University, Oct. 31, 1987.

"Raw Data for Determining Acid Gases, Trace Metals, and Organics from Cofiring Blends of Coal and Densified Refuse Derived Fuel (dRDF) Interim Report No. 2", Attili, et al., North Texas State University, Jan. 31, 1988.

"Raw Data for Determining Acid Gases, Trace Metals, and Organics from Cofiring Blends of Coal and Densified Refuse Derived Fuel (dRDF) Interim Report No. 3", Attili, et al., North Texas State University, May 31, 1988.

"Densified Refuse Derived Fuel as a Power Source", Daughterty, et al., *Proceedings of the American Power Conference*, Apr. 1986.

"Densified Refuse Derived Fuel—An Alternative Energy Source", Ohlsson, et al., *Proceedings of the American Association of Energy Engineers*, 1986. month unknown.

"Trash to Treasure", Carpenter, *Windows*, Spring 1988. No month available.

"A Burning Issue", Ferstl, *Resource Magazine*, North Texas State University, vol. 4, No. 1, 1988. No month available.

"When Its' Economic to Co–fire Refuse Derived Fuel with Coal", *Power* Magazine, vol. 131, No. 2, Feb. 1987, pp. 57–59.

*Primary Examiner*—Margaret Medley
*Attorney, Agent, or Firm*—Richards, Medlock & Andrews

[57] ABSTRACT

A refuse derived fuel (RDF) pellet having about 11% or more particulate calcium hydroxide which is utilized in a combustionable mixture. The pellets are used in a particulate fuel bring a mixture of 10% or more, on a heat equivalent basis, of the RDF pellet which contains calcium hydroxide as a binder, with 50% or more, on a heat equivalent basis, of a sulphur containing coal. Combustion of the mixture is effective to produce an effluent gas from the combustion zone having a reduced $SO_2$ and polycyclic aromatic hydrocarbon content of effluent gas from similar combustion materials not containing the calcium hydroxide.

12 Claims, No Drawings

BINDER ENHANCED REFUSE DERIVED FUEL

CROSS-REFERENCE TO RELATED APPLICATIONS

This is a division of U.S. patent application Ser. No. 08/110,397, filed Aug. 23, 1993, now abandoned, which is a continuation of U.S. patent application Ser. No. 07/368,184, filed Jun. 19, 1989 (now abandoned).

FIELD OF THE INVENTION

This invention relates to refuse derived fuels and more particularly to binder enhanced refuse derived fuel pellets and utilization of such pellets in solid-fuel fired furnaces.

BACKGROUND OF THE INVENTION

Refuse derived fuel (RDF) is a product of solid waste processing plants in which refuse such as municipal solid waste or industrial solid waste is treated in order to substantially reduce the amount of waste which is actually applied to landfills. The heat value of refuse derived fuel typically is about one-half to perhaps two-thirds that of anthracite coal and it can be used as a sole or primary fuel for power plants and the like or as a co-fuel in which it is mixed with another hydrocarbon fuel, typically coal.

It is a conventional practice to produce refuse derived fuel in the form of compacted pellets which are stored until needed as fuel in a combustion process. For example, U.S. Pat. No. 4,561,860 to Gulley et al. discloses a process in which raw waste is passed through a pulverizing and screening system to remove fines and large materials to produce an intermediate product which is supplied to an air classifier. The air classifier separates relatively light products such as paper and plastics from heavier products such as metal and glass. The light product is applied through a shredder and densifier to a drier where its moisture content is reduced to about 17%. The drier output is optionally mixed with coal dust in an amount of about 25 to 50 wt. %. The mixture of coal and refuse material is supplied to a densifying and pelletizing system in which the mixture is fed to a roller mill and extruded through a die screen to form the densified RDF pellets.

Binders may be incorporated into the refuse derived fuel in order to arrive at RDF pellets of enhanced compressive strength. For example, U.S. Pat. No. 4,405,331 to Blaustein et al. discloses refuse derived fuel pellets which incorporate a binder-fly ash system in addition to coal fines which may be optionally added to increase the heating value of the fuel. The preferred refuse component in Blaustein et al. is derived from solid refuse consisting substantially of solid cellulose based material such as paper and cardboard, plastic material such as styrofoam and soft plastics, soft metal wastes such as paper clips, staples and the like as well as glass. Preferably, the refuse component used in the Blaustein et al. process is substantially free of glass and metallic materials. Suitable binders disclosed in Blaustein include cornstarch, portland cement, asphalt emulsion and lignin. The RDF is extruded in pellets in the shape of cylinders ¾" in diameter by about ¾" in length having a dry form compressive stress of about 30 psi and a dry form moisture content of less than about 10% by weight. The RDF pellets produced by the Blaustein process have a heat value in excess of about 6000 BTUs per pound, permitting its use either as a primary or as a supplemental fuel source.

As noted previously, refuse derived fuel may be used as a sole fuel source or it may be used as a co-fuel with a fossil fuel such as coal. An advantage of refuse derived fuel is that it usually is of relatively low sulfur content, containing usually less than one-quarter percent but no more than one-half percent sulfur. Coal, on the other hand, is often relatively high in sulfur content, and as a consequence, steps must be taken when burning coal to reduce sulfur emissions. For example, as disclosed in U.S. Pat. No. 4,230,460 to Maust, a mixture of finely divided lime, limestone, or dolomite and flyash is added to powdered coal to provide a binder enabling the coal to be formed into pellets or briquets. The Maust process is proposed as an alternative to a fluidized combustion process in which crushed coal is burned in the presence of an agent such as limestone or dolomite to convert sulfur dioxide to solid calcium sulfite sulfate containing reaction products. The lime is described as a binder constituent which functions as a binder itself and as an initiator for a pozzolanic cementing action and as a desulfurizing agent during combustion. The lime and flyash are present in the form of a very finely divided powder which promotes a high degree of dispersion throughout the powdered coal to maximize the cementing action. The cement-like binder formed in the Maust process is said to break down upon combustion, regenerating lime and flyash in the fire box. The finely divided lime would then be available for in-furnace desulfurization of combustion gases with both reacted and unreacted lime particles being swept out of the fire box as entrained particulates.

Another procedure for upgrading coal is disclosed in U.S. Pat. No. 4,758,244 to Harvey et al. In the Harvey process, densified coal pellets of residual water content and enhanced calorific value are produced from brown coals which are comminuted by shearing to produce a wet plastic mass which is extruded into pellets. Sodium carbonate is added to the aqueous phase during plasticization in order to increase the strength of the densified product. Alkaline earth metal carbonates may also be employed and in addition, magnesium and calcium hydroxides can be added to provide a two-fold action, increasing the pH of acid coals while forming electrostatic bridge bonds utilizing acidic groups on the adjacent coal particles. In a specific example, 5% magnesium hydroxide produced an average compressive strength of 61 MPa as contrasted with 11 MPa for pellets without additives, while calcium hydroxide in amounts of 2% and 5% produced compressive strengths of 39 and 65 MPa, respectively.

SUMMARY OF THE INVENTION

In accordance with the present invention, there are provided processes for the utilization of binder enhanced RDF pellets in which pollutants, including acid gases, specifically SOx and NOx, and toxic substances, specifically polycyclic aromatic hydrocarbons and polychlorinated Biphenyls, are substantially reduced. In carrying out the invention an oxidant and a sulfur-containing particulate fuel are supplied to the combustion zone of a solid-fuel fired furnace. The particulate fuel comprises in excess of 10%, on a heat equivalent basis, of densified RDF pellets incorporating an alkaline earth metal hydroxide as a binder. Combustion conditions are established in the furnace and the particulate fuel is burned in the presence of the oxidant. A sufficient amount of alkaline earth metal hydroxide in the RDF pellets is provided effective to produce an effluent gas from the combustion zone having an analysis in which the $SO_2$ content is at least 20% less than the $SO_2$ content of an equivalent fuel mixture containing the same amount, on a heat equivalent basis, of RDF pellets in the absence of the alkaline earth metal hydroxide. Preferably, the fuel comprises a mixture of RDF pellets and a sulfur bearing fuel in which the RDF pellets incorporating the alkaline earth metal hydroxide binder are present in an amount of at least 15% on a heat equivalent basis. In a further aspect of the invention, the effluent gas from the combustion zone has a polycyclic aromatic hydrocarbon content which is at least 30% less than the polycyclic aromatic hydrocarbon content of an equivalent fuel containing the same amount of RDF pellets on a heat equivalent basis but in the absence of the alkaline earth metal hydroxide binder. In yet a further aspect of the invention, the effluent gas has a polychlorinated biphenyls content which is at least 50% less than the corresponding polychlorinated biphenyls content in the absence of the alkaline earth metal hydroxide binder.

The preferred binder for the RDF pellets is calcium hydroxide. The calcium hydroxide content will vary with the amount of moisture in the RDF fluff from which the pellets are derived, with higher moisture requiring more calcium hydroxide. In many cases, a suitable calcium hydroxide content will be within the range of 4–10 wt. %. However, in one aspect of the invention, in which the binder enhanced RDF pellets are mixed with extremely high sulfur content coals, pellets incorporating the calcium hydroxide binder in amounts in excess of 10 wt. % may be employed. Such pellets may contain from 11–25 wt. % calcium hydroxide and more preferably from 12–20% calcium hydroxide.

In a further aspect of the invention there is provided a method for the production of densified RDF pellets. Particulate calcium hydroxide having an average particle size of less than 0.5 millimeter (passing a No. 35 U.S. sieve) is added to an RDF fluff having a moisture content within the range of about 10–50 wt. %. The mixture resulting from addition of the particulate calcium hydroxide is agitated to provide a product in which the calcium hydroxide is distributed throughout the fluff and in relatively intimate contact therewith. This mixture is then passed to an extrusion system in which the mixture is densitized and pelletized. In this step, the mixture is passed through an extrusion die having an extrusion diameter within the range of about ½ to 1 inches. The calcium hydroxide-fluff mixture is extruded through the extrusion die at a temperature within the range of about 140°–190° F. and at a residence time within the range of 2–10 seconds. Preferably, the extrusion diameter is about ¾ inch and the residence time is about 3–5 seconds at a temperature of about 150°–170° F.

DETAILED DESCRIPTION OF THE INVENTION

Refuse derived fuels are, as noted previously, a product of the recycling and processing of solid waste products, principally municipal solid waste, and, to a lesser extent, industrial solid waste, which normally are disposed of in land fills. Municipal solid waste is principally composed of cellulosic materials such as paper, cardboards, wood, grass clippings and the like, and minor amounts of food wastes and plastics. Minor amounts (about 15–30%) of nonorganic materials, such as metal and glass, are also present in municipal solid waste.

Various processing formats are followed in manufacturing products which ultimately lead to refuse derived fuels. Typically, when the solid waste arrives at the processing facility, large or hazardous items such as appliances, mattresses, car batteries, and the like, are separated from the refuse. The refuse is then subjected to a screening process for the removal of fine organic materials and then is classified, usually manually, for recyclable items such as aluminum, glass and cardboard. After shredding, the refuse is moved through a magnetic separator for the removal of ferrous materials and then passed to an air classifier such as a cyclone or other suitable system. After further shredding, a low density "fluff" is produced. This material has a very low bulk density, several pounds per cubic foot, and can be burned in air-suspension type combustion zones. Usually, however, the fluff is densified and pelletized to arrive at solid pellets having bulk densities ranging from about 20–40 pounds per cubic foot. At the conclusion of the shredding process, the fluff has a moisture content of about 10–40 wt. %, usually about 20–30%. Principal components of the fluff are, of course, cellulosic materials, with minor amounts of other organic materials and plastics.

In forming RDF pellets, binders may be employed in order to increase the density and integrity of the RDF pellets. Unlike coal fines, which are relatively homogeneous with a relatively narrow particle size distribution, RDF fluff is a low density heterogeneous mass of irregularly shaped particles having a relatively broad particle size distribution. Thus, where binder enhancement has been practiced in formulating RDF pellets, the binders normally have taken the form of hydraulic cements, such as portland cement, or organic based materials, such as lignins and corn starches.

The present invention employs an alkaline earth metal hydroxide as a binder for densified RDF pellets. The preferred alkaline earth metal hydroxide is calcium hydroxide and the invention will be described in detail with regard to the use of calcium hydroxide in binder enhancement for RDF pellets. However, it is to be understood that other alkaline earth metal hydroxides may also be employed. For example, alkaline earth metal hydroxides derived from dolomitic materials and containing both calcium and magnesium hydroxides may be used as binders. While alkaline earth metal hydroxides, other than calcium and magnesium hydroxide, can, in theory, be used as binders in the present invention, those skilled in the art will recognize that economic and other considerations will, as a practical matter, preclude their use.

A number of factors are to be considered in determining the amount of calcium hydroxide, or other alkaline earth metal hydroxide, which is added to the RDF fluff in forming the binder enhanced pellets. As described in greater detail hereinafter, the calcium hydroxide preferably is added to the RDF fluff as a finely ground dry powder. No water is intentionally added to the calcium hydroxide, the fluff, or the ultimate mixture in order to form a plastic mass as is done in some RDF benefication procedures. Normally, at least 2 wt. % calcium hydroxide will be employed, i.e., 2 weight parts calcium hydroxide to 98 weight parts RDF fluff. As the moisture content of the RDF fluff increases, it will usually be desirable to increase the amount of calcium hydroxide binder. Most RDF fluffs have an innate moisture content of at least 20–30% and from the standpoint of moisture only, 2% calcium hydroxide is satisfactory. Moisture contents of some fluffs, however, may range up to 40–50%, and in this case, the calcium hydroxide content should range from about 6–10 wt. % or more.

In formulating the binder enhanced RDF pellets, it is important that the calcium hydroxide and RDF fluff be mixed together in a manner to provide good distribution of calcium hydroxide throughout the fluff and intimate contact between the fluff and calcium hydroxide. Preferably, the calcium hydroxide is ground to provide an average particle size of less than 0.5 mm. The particle size of the calcium hydroxide normally should not fall below 0.04 mm (retained on a No. 400 US sieve) in order to prevent excessive dust suspension during the manufacturing procedure. Although either batch type or continuous type of mixing can be employed to arrive at the calcium hydroxide fluff mixture, as a practical matter, it usually will be desirable to use a continuous type mixing process. By way of example, the finely divided calcium hydroxide may be added to the RDF fluff by means of gravity feed from a metered hopper into a screw type conveyor inclined at a positive slope of about 30–45 degrees. As the fluff-calcium hydroxide mixture moves up the conveyor, the mechanical agitation and tumbling action provides for good distribution of the calcium hydroxide throughout the fluff.

The upper end of the conveyor empties by gravity feed into the hopper for a pellet mill which may be of the general type disclosed in the aforementioned patent to Gulley et al., having roller mills located within a rotating die screen. The manner in which the fluff-calcium hydroxide mixture is extruded through the extrusion die, provided by the die screen or by any other suitable means, is important in imparting the desired properties to the pellets. Factors affecting pellet characteristics include the length of the extrusion channels (the thickness of the wall of the die screen as disclosed in the Gulley et al. patent), the extrusion diameter (the diameter of the extrusion channels in the die screen), and the extrusion temperature (the temperature of the fluff-calcium hydroxide mixture as it is extruded through the die screen). In general, if the extrusion temperature is too great, the residence time too long, or the extrusion diameter too small, the extruder will tend to plug up. However, at the other extreme, if the extrusion temperature is too low, the extrusion residence time too short or the extrusion diameter too great, the pellets do not achieve the desired degree of densification and are of a relatively poor integrity. Preferably, the extrusion diameter is within the range of ½ to 1 inch, with an extrusion diameter of about ¾ inch appearing to provide optimum results. The extrusion temperature desirably is within the range of 140°–190° F. with a temperature of about 150°–170° F. being most preferred. The residence time should be within the range of 2–10 seconds with 3–5 seconds being preferred.

Increasing amounts of calcium hydroxide generally result in increasing density of the binder enhanced RDF pellets up to a calcium hydroxide content of about 10%. Above this value, the density of the pelletized product decreases. Thus, from the standpoint of binder enhancement, 10% calcium hydroxide is considered to be the upper limit. However, as will appear hereinafter, higher concentrations of calcium hydroxide are effective in terms of reducing the undesirable or toxic emissions in certain applications of the invention.

A conventional use of RDF pellets is as a co-fuel with particulate coal in solid-fuel fired furnaces, such as in power plants and the like. Pollutants in the emissions from such furnaces include acid gases, SOx, and NOx which lead to the precipitation of so-called "acid rains", and polycyclic aromatic hydrocarbons (PAHs) and polychlorinated biphenyls (PCBs).

In the combustion of RDF-coal mixtures, SOx emissions (principally sulfur dioxide with minor amounts of sulfur trioxide) are derived primarily from the coal. In this respect, RDF pellets normally have a relatively low sulfur content or perhaps ¼%, seldom exceeding ½%. The sulfur content of coal normally is substantially higher, ranging up to 2 ½% or more. Thus, it can be seen that the SOx emissions are due primarily to the sulfur found in the coal and, in a coal-RDF pellet mixture, can be expected to decrease as the amount of RDF pellets in the mixture is increased.

NOx emissions (nitric oxide and nitrogen dioxide) are derived from nitrogenous compounds in the coal and RDF pellets and from molecular nitrogen in the air. Nitrogen-containing compounds are found both in the coal and the RDF pellets with the nitrogen content of the coal usually being higher. NOx formation from molecular nitrogen in the air is directly dependent upon the combustion temperatures with higher temperatures leading to higher NOx formation. Under these circumstances, it would normally be expected that NOx emissions, as well as SOx emissions, would decrease as the RDF content in the coal RDF mixture increases.

The polycyclic aromatic hydrocarbons (PAHs) emitted in solid fuel combustion processes include compounds containing from about 2–7 aromatic rings, generally in condensed ring structures. Polycyclic aromatic compounds such as benzo-a-pyrene and methylcholanthrene are carcinogenic; others such as naphthalene and anthracene are not. Polycyclic aromatic hydrocarbons in combustion products, and which were measured in the experimental work described hereinafter, include naphthalene, acenaphthylene, benzo-a-anthracene, chrysene, acenaphthene, benzo-a-fluoranthene, fluorene, benzo-k-fluoranthene, phenanthrene, benzo-a-pyrene, anthracene, dibenzo-a,h-anthracene, fluoranthene, benzo -g,h,i,-perylene, pyrene and indendo-1,2,3-c,d pyrene. Polycyclic aromatic compounds are formed during the combustion process in the course of incomplete combustion of hydrocarbons and hence, can derive from the use of coal or RDF.

Polychlorinated biphenyls are characterized by the general formula:

$$C_{12}H_mCl_n \qquad (1)$$

wherein: the sum of m and n is 10 and n is at least 1. PCBs in combustion effluents result from the corresponding products found in the fuel and as combustion by-products of hydrocarbons burned in the presence of chlorine from a variety of sources.

The calcium hydroxide employed as a binder in formulating the densified RDF pellets in accordance with the present invention functions to reduce not only $SO_2$ emissions but also NOx, Hcl and $CO_2$ emissions and emissions of polycyclic aromatic hydrocarbons and polychlorinated biphenyls. Experimental work carried out respecting the invention initially indicated that the calcium hydroxide binder was an effective pollutant suppressant only in coal-RDF pellet mixtures containing 10% RDF pellets on a heat equivalent basis.* Specifically, the experimental work initially indicated that the binder was effective in suppressing $SO_2$ emissions at a mixture containing 10% RDF pellets and 90% coal but was ineffective when the RDF content was increased to 20%. The efficiency of the binder in suppressing NOx content was inconclusive with some tests showing a suppression at 10 and 20% RDF pellets and others showing substantially no effectiveness.

*Unless otherwise indicated herein, relative amounts of RDF pellets and coal are given on a heat equivalent basis. Thus for RDF pellets having a heat content of 7,000 BTUs per pound and coal having a heat content of 11,000 BTUs per pound, a mixture containing a 10% RDF pellets and 90% coal on a heat equivalent basis would contain about 15 wt. % RDF and about 85 wt. % coal.

With respect to polycyclic aromatic hydrocarbon content, the data initially showed good suppression for RDF-coal mixtures containing 10% RDF but showed that the binder actually enhanced PAH emissions when going to 20% RDF.

Subsequent analysis of the data resulting from this experimental work, however, indicates that the calcium hydroxide binder is effective in reducing the content of undesirable pollutants when the RDF pellets are employed in higher percentages, specifically 20% and 30% RDF pellets and up to 50% pellets on a heat equivalent basis. $SO_2$ content can be materially decreased by using the binder in the high RDF content fuel mixture and if NOx is not decreased, the binder clearly exerts no deleterious effect. However, PAH and PCB contents are materially decreased through the use of the binder in the high RDF content fuel mixtures.

In experimental work respecting the invention, a total of 300 tons of RDF pellets were burned as a co-fuel with a high sulfur content coal in the furnace of a boiler, one of five providing the steam requirements for Argonne National Laboratory, Argonne, Ill. The boiler had a rated capacity of 170,000 pounds of steam per hour at a gauge pressure of 200 psig saturated.

The furnace of the boiler was provided with air pollution control equipment consisting of serially connected multicyclones, a lime spray dryer absorber, and a fabric-filter bag house. The furnace effluent was first applied to the multicyclone system where particulates were removed followed by application to the spray dryer. Contact between the flue gases and the lime feed slurry in the spray dryer absorbs sulfur dioxide and cools the flue gases. Design specifications for the spray dryer absorber call for at least 78.3% of the sulfur dioxide in the flue gases to be removed. A portion of the resulting dry product including fly ash, calcium sulfite and sulfate, and unreacted lime particles falls to the bottom of the absorption chamber. The cooled flue gases from the spray dryer absorber system are then passed to the baghouse module where the remaining fly ash and other particulate materials are removed. In the course of the experimental work, emission samples were manually taken at three sites; site one within the combustion zone at an approximate temperature of 1200° F., site two between the multicyclone and spray dryer modules at temperature of about 320° F., and site three in the stack, after all pollution control equipment at a temperature of about 170° F.

The RDF pellets used in the experimental work were obtained from two manufacturing sources, identified herein as Source A and Source B, and included pellets without a binder, and pellets containing 4 wt. % and 8 wt. % calcium hydroxide binder. These pellets were blended with the high sulfur content coal at amounts, on a heat equivalent basis, of 10, 20, 30 and 50%. The coal used in the experimental work was a high-sulfur Kentucky coal having a sulfur content on an as received basis (about 6.3% moisture) of 2.7 wt. % and on a dry basis of 2.88 wt. %. The coal had an average heat content of 11,200 BTUs per pound on an as received basis.

The RDF fuel pellets had a sulfur content of about ¼ wt. %. The Source A pellets had a heat value of about 7500 BTUs per pound, the Source B pellets about 7000 BTUs/pound. The Source A pellets were generally observed to be more homogeneous and retained their integrity better than the Source B pellets. Also, the Source A pellets were found generally to be closer in actual binder content to the nominal binder content than the Source B pellets.

In reporting the experimental work, the use of coal-RDF pellet mixtures or coal alone was broken down into 12 segments of coal alone or of increasing RDF content, identified as Runs 1 through 12. These runs are summarized below in Table I in terms of the coal-RDF pellet content (on a heat equivalent basis), weight percent calcium hydroxide binder and approximate run length in hours. In two runs, Runs 9 and 10, the RDF fluff from which the pellets were prepared contained a reduced amount of plastics. The pellets used in all other runs contained unmodified amounts of plastics as received at the municipal solid waste resource recovery plants.

TABLE I

| Run # | Composition | $Ca(OH)_2$ | Run Length Hours |
|---|---|---|---|
| 1 | Coal | — | 89 |
| 2 | Coal/10% RDF | 0 | 74 |
| 3 | Coal/10% RDF | 4 | 74 |
| 4 | Coal/10% RDF | 8 | 74 |
| 5 | Coal/20% RDF | 0 | 112 |
| 6a | Coal/30% RDF | 8 | 60 |
| 6b | Coal/30% RDF | 4 | |
| 7 | Coal/20% RDF | 4 | 68 |
| 8 | Coal/20% RDF | 8 | 52 |
| 9 | Coal/30% RDF a | 0 | 24 |
| 10 | Coal/30% RDF a | 4 | 15 |
| 11 | Coal/50% RDF | 4 | 30 |
| 12 | Coal | — | 114 |

The runs are characterized in more detail in Table II in terms of the sequence in which they occurred. In addition, the source of the RDF pellets are indicated by the designations A or B as previously discussed. In Table II, the start and endings of the runs are designated by S and E, respectively. As indicated in Table II, Runs 1 and 12 (coal only) were actually split with intervening runs involving coal-RDF pellet mixtures. Particularly with respect to Run 12, it is thought that the analytical results discussed below may have been biased by preceding runs involving RDF pellets in the fuel.

TABLE II

| Time | Date | Run # | Composition | % Ca(OH) |
|---|---|---|---|---|
| | 1–5 June | (1)S/E | Coal | |
| 9:00 PM | 5 June | (2)S | Coal/10% A | 0 |
| 10:00 AM | 7 June | (2)E | Coal/10% A | 0 |
| 10:00 AM | 7 June | (2)S | Coal/10% B | 0 |
| 11:00 PM | 8 June | (2)E | Coal/10% B | 0 |
| 11:00 PM | 8 June | (3)S | Coal/10% A | 4 |
| 12:00 N | 10 June | (3)E | Coal/10% A | 4 |
| 12:00 N | 10 June | (3)S | Coal/10% B | 4 |
| 1:00 AM | 12 June | (3)E | Coal/10% B | 4 |
| 1:00 AM | 12 June | (4)S | Coal/10% A | 8 |
| 2:00 PM | 13 June | (4)E | Coal/10% A | 8 |
| 2:00 PM | 13 June | (4)S | Coal/10% B | 8 |
| 3:00 AM | 15 June | (4)E | Coal/10% B | 8 |
| 3:00 AM | 15 June | (1)S | Coal | |
| 8:00 PM | 18 June | (1)E | Coal | |
| 8:00 PM | 18 June | (5)S | Coal/20% A | 0 |
| 8:00 PM | 20 June | (5)E | Coal/20% B | 0 |
| 8:00 PM | 20 June | (5)S | Coal/20% B | 0 |
| 12:00 N | 23 June | (5)E | Coal/20% B | 0 |
| 12:00 N | 23 June | (7)S | Coal/20% B | 4 |
| 8:00 PM | 23 June | (7)E | Coal/20% A | 4 |
| 8:00 PM | 23 June | (6)S | Coal/30% B | 8 |
| 8:00 AM | 25 June | (6)E | Coal/30% B | 8 |
| 8:00 AM | 25 June | (6)S | Coal/30% B | 4 |
| 8:00 AM | 26 June | (6)E | Coal/30% B | 4 |
| 8:00 AM | 26 June | (7)S | Coal/20% A | 4 |
| 8:00 PM | 28 June | (7)E | Coal/20% A | 4 |
| 8:00 PM | 28 June | (8)S | Coal/20% A | 8 |
| 12:00 M | 1 July | (8)E | Coal/20% A | 8 |
| 12:00 M | 1 July | (12)S | Coal | |
| 6:00 PM | 4 July | (12)E | Coal | |
| 6:00 PM | 4 July | (11)S | Coal/50% B | 4 |
| 12:00 M | 5 July | (11)E | Coal/50% B | 4 |
| 12:00 M | 5 July | (12)S | Coal | |
| 12:00 M | 6 July | (12)E | Coal | |
| 12:00 M | 6 July | (9)S | Coal/30% B | 0 |

TABLE II-continued

| Time | Date | Run # | Composition | % Ca(OH) |
|---|---|---|---|---|
| 12:00 M | 7 July | (9)E | Coal/30% B | 0 |
| 12:00 M | 7 July | (10)S | Coal/30% B | 4 |
| 3:00 PM | 8 July | (10)E | Coal/30% B | 4 |
| 3:00 PM | 8 July | (12)S | Coal | |

During the course of the experimental work, samples taken at sites 2 and 3 were analyzed for contents of $SO_2$, NOx, HCl, polyaromatic hydrocarbons and polychlorinated biphenyls.

As will be understood by those skilled in the art, samples taken at site 2 are more closely representative of the amount of pollutants in the combustion zone effluent than those taken at site 3, after the emission control modules. In this respect, the treatment of the combustion effluent in the multicyclone module, which removes only particulate matter, should have substantially no impact upon the $SO_2$, NOx, $CO_2$ or HCl in the effluent. The polychlorinated biphenyls and the polyaromatic hydrocarbons should be substantially in the vapor phase when passing through the multicyclone module and thus only minor amounts of these components should have been removed in the first emission control module. It is believed that only when the temperature of the flue gas drops below 300° F. does condensation and absorption of these materials onto particulates occur. Accordingly, experimental work was evaluated on the basis that no more than 10 to 20% of polyaromatic hydrocarbons and polychlorinated biphenyls were actually removed in the multicyclone module.

The acid gases were collected from the combustion effluent using an Anderson Model 300 gas sampler and analyzed by ion chromatography using a Dionex Model 2010I Ion Chromatograph. The trapping reagents used in the samplers were, for the most part, 2 wt. % sodium hydroxide solutions and aqueous solutions of 2 wt. % sodium hydroxide and 4 wt. % potassium permanganate. In some cases other reagents were used as indicated in Table IV, set forth below. The 2% sodium hydroxide solution was considered to yield the most accurate results in the collection of HCl, and the 2% sodium hydroxide, 4% potassium permanganate solution was considered to be most effective for the collection of $SO_2$ and NOx. The relative efficacy of these two reagents is indicated by comparative samples taken about three hours apart at site two during Run 9 as reported in Table III.

TABLE III

| Time | Reagents | Sites | HCl | NOx | $SO_2$ |
|---|---|---|---|---|---|
| 7/7 11:16 | 2% NaOH/4% KMnO | 2 | 20.9 | 215.8 | 1172 |
| 7/7 14:29 | 2% NaOH | 2 | 25.5 | 12.7 | 999.6 |

Table IV sets forth the HCl, NOx, and $SO_2$ content in the flue gases as collected at sites two or three during the experimental work. The data in Table IV are set forth in terms of increasing content of RDF pellets.

TABLE IV

| | | | | Parts Per Million (V/V) | | |
|---|---|---|---|---|---|---|
| Date | Time | Reagents | Site | HCl | NOx | $SO_2$ |
| 6/5 | 15:00 | 2% NaOH | 3 | 1.92 | 592 | 308 |
| 6/15 | 10:43 | 1.2% NaOH | 2 | 11.16 | <6 | 1189.6 |
| 6/15 | 11:39 | 2% NaOH 4% $KMnO_4$ | 2 | 7.3 | 288 | 1602 |
| 6/15 | 12:24 | 2% NaOH | 2 | 15.7 | <7 | 1202 |
| 6/18 | 10:25 | 2% NaOH | 2 | 14.2 | 5.4 | 1324 |
| 6/18 | 11:36 | 2% NaOH 4% $KMnO_4$ | 2 | 7.8 | 328 | 1637 |
| 7/1 | 16:25 | 2 NaOH 4% $KMnO_4$ | 3 | 0.3 | 84 | 501 |
| 7/2 | 11:28 | 2% NaOH | 2 | 15.3 | <6 | 1370 |
| 7/2 | 14:18 | 2% NaOH 4% $KMnO_4$ | 2 | 8.3 | 201 | 1537 |
| 7/3 | 11:30 | 2% NaOH 2% $H_2O_2$ | 3 | 0.84 | 46.6 | 407 |
| 7/3 | 12:24 | 2% NaOH | 3 | 0.73 | <7 | 409 |
| 7/3 | 15:46 | 2% NaOH 4% $KMnO_4$ | 3 | <0.7 | 178 | 341 |

| Date | Time | Reagents | Site | HCl | $NO_x$ | $SO_x$ | dRDF | Binder |
|---|---|---|---|---|---|---|---|---|
| | | | Coal/10% RDF | | | | | |
| 6/6 | 18:00 | 2% NaOH | 2 | 27.9 | <5 | 1270 | TRF#1 | 0% |
| 6/7 | 14:52 | 2% NaOH | 3 | 0.186 | <3 | 3937 | MIN#1 | 0% |
| 6/7 | 15:55 | 2% NaOH 4% $KMnO_4$ | 3 | 0.969 | 327 | 103 | MIN#1 | 0% |
| 6/8 | 8:00 | 2% NaOH 4% $KMnO_4$ | 2 | 23.2 | 431 | 1484 | MIN#1 | 0% |
| 6/8 | 9:00 | 2% NaOH | 2 | 25.5 | <4 ppm | 1247 | MIN#1 | 0% |
| 6/13 | 10:15 | 2% NaOH 4% $KMnO_4$ | 2 | 19.7 | 356 | 1380 | TRF#3 | 8% |
| 6/13 | 12:50 | 2% NaOH | 2 | 25.8 | <6 ppm | 1064 | TRF#3 | 8% |
| 6/14 | 10:45 | 2% NaOH 4% $KMnO_4$ | 3 | 0.42 | 328 | 367 | MIN#3 | 8% |
| 6/14 | 11:39 | 2% NaOH 3% NaOH | 3 | 0.56 | 40.4 | 371 | MIN#3 | 8% |
| 6/14 | 13:26 | 2% $H_2O_2$ | 3 | <1 | <6 | 338 | MIN#3 | 8% |

TABLE IV-continued

Coal/20% RDF

| Date | Time | Treatment | | | | | | |
|---|---|---|---|---|---|---|---|---|
| 6/19 | 10:50 | 2% NaOH 4% KMnO$_4$ | 2 | 17.88 | 244.5 | 1292 | TRF#4/5 | 0% |
| | 11:40 | 2% NaOH | 2 | 36.5 | <6 | 1075 | TRF#4/5 | 0% |
| 6/20 | 10:26 | 2% NaOH 4% KMnO$_4$ | 3 | 0.26 | 180.7 | 108 | TRF#4/5 | 0% |
| 6/20 | 11:27 | 2% NaOH | 3 | 0.19 | <1.5 | 250 | TRF#4/5 | 0% |
| 6/21 | 11:22 | 2% NaOH 4% KMnO$_4$ | 2 | 15.9 | 263 | 1340 | MIN#4/5 | 0% |
| 6/21 | 12:50 | 2% NaOH | 2 | 21.8 | <12 | 1027 | MIN#4/5 | 0% |
| 6/21 | 13:50 | 4% NaOH | 2 | 23.1 | <12 | 1092 | MIN#4/5 | 0% |
| 6/22 | 11:03 | 2% NaOH 4% KMnO$_4$ | 2 | 18.1 | 236.8 | 1336 | MIN#4/5 | 0% |
| 6/22 | 11:55 | 6% NaOH | 2 | 27.6 | <12 | 1164 | MIN#4/5 | 0% |
| 6/22 | 12:56 | 8% NaOH | 2 | 27.4 | <12 | 1245 | MIN#4/5 | 0% |
| 6/29 | 11:54 | 2% NaOH 4% KMnO$_4$ | 2 | 19.0 | 235.7 | 1350 | TRF#8/9/10 | 8% |
| 6/29 | 12:45 | 2% NaOH | 2 | 37.7 | <6 | 1196 | TRF#8/9/10 | 8% |
| 6/30 | 11:58 | 2% NaOH 2% H$_2$O$_2$ | 2 | 31.6 | 24.8 | 1136 | TRF#8/9/10 | 8% |
| 6/30 | 12:47 | 2% NaOH | 2 | 32.1 | <6 | 1066 | TRF#8/9/10 | 8% |
| 6/30 | 16:30 | 2% NaOH (no cooling) | 2 | 20.4 | <6 | 1056 | TRF#8/9/10 | 8% |
| 6/30 | 17:41 | 2%NaOH 4% KMnO$_4$ | 2 | 18.7 | 93.3 | 1313 | TRF#8/9/10 | 8% |
| 7/1 | 12:06 | 2% NaOH 2% H$_2$O$_2$ | 3 | 0.21 | 13.5 | 482 | TRF#8/9/10 | 8% |
| 7/1 | 13:03 | 2% NaOH | 3 | 0.33 | <2 | 439 | TRF#8/9/10 | 8% |
| 7/1 | 16:25 | 2% NaOH 4% KMnO$_4$ | 3 | 0.29 | 84 | 501 | TRF#8/9/10 | 8% |

The use of the calcium hydroxide binder in accordance with the present invention also provides for a reduction in carbon dioxide emissions. For coal-RDF pellets containing 4% calcium hydroxide, the effluent gas from the combustion zone has a reduction of at least 5 wt. % carbon dioxide as compared with an equivalent fuel containing the same amount of RDF pellets on a heat equivalent basis, but without binder in the pellets. For the coal RDF pellets containing 8% calcium hydroxide binder, the corresponding reduction in carbon dioxide is at least 20 vol. %. Table V sets forth the average carbon dioxide content in flue gases collected at site two during the experimental work. The data set forth in Table V are for 10%, 20% and 30% RDF pellet mixtures with coal for calcium hydroxide binder concentrations of 0, 4 and 8 wt. %. The baseline value for coal burned alone without any RDF pellets was about 9.1%.

TABLE V

Average Vol % CO$_2$

| | Source B | Source A |
|---|---|---|
| 10% d-RDF | | |
| CaOH | | |
| 0 | 9.3 | 9.5 |
| 4 | 8.5* | 8.8 |
| 8 | 8.5* | 9.3 |
| 20% d-RDF | | |
| 0 | 8.0 | 9.1 |
| 4 | — | 8.8 |
| 8 | — | 8.1 |
| 30% d-RDF | | |
| 0 | 9.4* | |
| 4 | 8.6 | |
| 8 | 8.0* | |

*Averages based on a single value

The polyaromatic hydrocarbon and polychlorinated biphenyl emissions observed during the experimental work are set forth in Tables VI and VII. The results for the samples taken at site two are set forth in Table VI while the results for the samples taken at site three are set forth in Table VII. The site two samples are, of course, more representative of the PAH and PCB contents in the effluent combustion gases from the combustion zone.

TABLE VI

| | | Pellet | Mg/M$^3$ | |
|---|---|---|---|---|
| Run | Sample | Source | PAHs | PCBs |
| 1 | 1 | — | 0.017 | 0.0062 |
| 1 | 2 | — | 0.039 | 0.11 |
| 1 | 3 | — | 0.060 | 0.63 |
| 2 | 1 | B | 0.0010 | 0.013 |
| 2 | 2 | A | 0.076 | 0.27 |
| 2 | 3 | A | 0.056 | 0.0049 |
| 2 | 4 | A | 0.016 | 0.012 |
| 3 | 1 | A | 0.016 | 0.014 |
| 3 | 2 | A | 0.062 | 0.0072 |
| 3 | 3 | A | 0.0026 | 0.0055 |
| 4 | 1 | B | 0.0040 | 0.0076 |
| 4 | 2 | A | 0.0081 | 0.0077 |
| 4 | 3 | A | 0.0052 | 0.0040 |
| 5 | 1 | B | 0.035 | 0.0097 |
| 5 | 2 | B | 0.046 | 0.0077 |
| 5 | 4 | A | 0.026 | 0.064 |
| 5 | 7 | A | 0.018 | 0.00029 |
| 6a | 1 | A | 0.016 | 0.0025 |
| 6a | 2 | A | 0.029 | 0.00077 |
| 6b | 3 | A | 0.028 | 0.0069 |
| 6b | 4 | A | 0.14 | 0.00062 |
| 7 | 1 | B | 0.22 | 0.0020 |
| 7 | 2 | B | 0.35 | 0.29 |
| 8 | 1 | B | 0.18 | 0.12 |
| 8 | 2 | B | 0.24 | 0.013 |
| 8 | 3 | B | 0.054 | 0.14 |
| 8 | 4 | B | 0.30 | 0.0034 |
| 9 | 1 | A | 0.19 | 0.0046 |
| 9 | 2 | A | 0.039 | 0.0034 |

TABLE VI-continued

| Run | Sample | Pellet Source | Mg/M³ PAHs | PCBs |
|-----|--------|---------------|------|---------|
| 10 | 1 | A | 0.09 | 0.00088 |
| 10 | 2 | A | 0.013 | 0.00029 |
| 11 | 1 | A | 0.16 | 0.00065 |
| 11 | 2 | A | 0.26 | 0.0024 |
| 12 | 1 | — | 0.34 | 0.0054 |
| 12 | 2 | — | 0.13 | 0.00039 |

TABLE VII

| Run | Sample | Pellet Source | Mg/M³ PAHs | PCBs |
|-----|--------|---------------|------|---------|
| 1 | 1 | — | 0.0046 | 0.00053 |
| 2 | 1 | A | 0.0063 | 0.0012 |
| 2 | 2 | A | 0.015 | |
| 2 | 3 | A | 0.0081 | 0.0016 |
| 2 | 1 | A | 0.0073 | 0.0091 |
| 4 | 1 | A | 0.0073 | 0.00011 |
| 4 | 2 | A | 0.0031 | 0.0031 |
| 5 | 1 | B | 0.00036 | 0.00028 |
| 5 | 2 | A | 0.0040 | 0.0012 |
| 7 | 1 | B | 0.079 | 0.042 |
| 7 | 2 | B | 0.049 | 0.0065 |
| 8 | 1 | B | 0.0010 | 0.0024 |
| 8 | 2 | B | 0.0081 | 0.00085 |
| 12 | 1 | — | 0.070 | 0.0040 |
| 12 | 2 | — | 0.0014 | 0.00043 |

As noted previously, the Source A RDF pellets were generally more homogeneous in nature than the Source B pellets. In addition, analysis of the type A pellets show them to be consistently closer to the nominal calcium hydroxide concentration than the type B pellets. Also, the Source A pellets progressively increased in density with increasing calcium hydroxide content. The Source A pellets with no binder had an average bulk density of 42.0 lb/ft³, those with 4% calcium hydroxide binder had an average density of 43.3 lb/ft³ and those with 8% calcium hydroxide binder had an average bulk density of 45.7 lb/ft₃. The Source B pellets on the other hand failed to show this relationship. The average bulk densities for no binder, 4% calcium hydroxide and 8% calcium hydroxide where 26.8, 25.6, and 26.8 lb/ft³.

On consideration of the data reported above, it can be seen that the $SO_2$ and NOx contents decrease as the RDF content in the fuel mixture increases. Above this, the calcium hydroxide shows a pronounced effect in decreasing the SOx content. This effect is clearly shown when the data for the 80% coal—20% RDF mixture employing pellets from Source B are discounted. In both 10% and 30% RDF pellets, substantial decreases in SOx emissions are observed when going from no binder to 4% and 8% calcium hydroxide.

With respect to NOx emissions, some decrease is shown for the 90% coal, 10% RDF mixture. Some of the data actually indicates an increase in NOx emissions when employing binder containing pellets in amounts in excess of 10%. However, when the data based upon pellets from Source B are discounted, it appears that the presence of binder in the higher RDF content fuels, if not effective in reducing NOx emissions, has no deleterious effect. HCl content increases with increasing RDF pellet content as would be expected since the primary Source of chlorine is the plastic content of the RDF. The binder appears to have a slight effect on HCl content up to about 30% RDF in the fuel mixture.

The data for coal only and for 10% and 30% RDF mixtures shows that the calcium hydroxide binder causes a substantial reduction in PCB and PAH emissions when only the data based upon Source A pellets is considered. For a mixture of 80% coal and 20% RDF pellets, the site 2 data shows a substantial increase in PAH content when going from no binder to 4% binder and a reduction in PAH content when going from 4% to 8% binder, the emission data for 80% calcium hydroxide still being substantially above the mixture in which no binder is present.

The use of the calcium hydroxide binder adds to the ash content which ultimately must be disposed of in some manner and accordingly it usually will be desirable to limit the calcium hydroxide binder to 10 wt. %. However, a binder content in excess of 10% can be employed and this is advantageous in those cases where the RDF pellets are mixed with coals of relatively high sulfur content. In this respect coals available for combustion in power plant furnaces and the like often exhibit sulfur contents of 3–4 wt. % and even higher sulfur contents of up to 6–7 wt. % are sometimes encountered. In this case, RDF pellets containing a calcium hydroxide binder content of 11% or more can be burned as a co-fuel with the particulate coal in order to provide for enhanced reduction in sulfur dioxide emissions due to sulfur in the coal. Calcium hydroxide binder contents up to 25 wt. % may be employed. A preferred calcium hydroxide content for use with such high sulfur content coals is within the range of 12–20 wt. %.

Having described specific embodiments of the present invention, it will be understood that modification thereof may be suggested to those skilled in the art, and it is intended to cover all such modifications as fall within the scope of the appended claims.

We claim:

1. A combustible product comprising a mixture of
   (a) 10 to 50% on an heat equivalent basis of pellets of densified refuse derived fuel containing at least about 11% calcium hydroxide binder and no more than about 89% of a refuse derived fuel fluff component derived from substantially cellulose based waste material; and
   (b) 50 to 90% on a heat equivalent basis of sulfur containing coal particles having a sulfur content of at least about 3 wt. %.

2. The combustible product of claim 1, wherein said calcium hydroxide content is of said pellets within the range of about 11 wt. % to about 25 wt. %.

3. The combustible product of claim 1, wherein said calcium hydroxide content of said pellets is at least about 12 wt. % to 20 wt. %.

4. The combustible product of claim 2, wherein said calcium hydroxide content of said pellets is within the range of about 12 wt. % to about 20 wt. %.

5. A process to form a combustible refuse derived fuel pellet comprising the steps
   (a) adding about 11% or more of a particulate calcium hydroxide having an average particle size of less than 0.5 millimeters with a refuse derived fluff having a moisture content within the range of 10 wt. % to 40 wt. %;
   (b) agitating the mixture resulting from step (a) to provide a mixture in which said calcium hydroxide and said refuse derived fluff are in intimate contact;
   (c) passing the mixture of step (b) to an extrusion system in which said mixture is densified and pelletized by extrusion through an extrusion die having an extrusion diameter of about ½ inch to 1 inch; and
   (d) extruding said calcium hydroxide fluff mixture at a temperature within the range of about 140° F. to about 190° F. and at an extrusion residence time within the range of about 2 seconds to about 10 seconds.

6. The process of claim 5, wherein said extrusion diameter is about 0.75 inch.

7. The process of claim 5, wherein said residence time is about 3 seconds to about 5 seconds.

8. The process of claim 7, wherein said extrusion temperature is about 150° to about 170° F.

9. A combustible refuse derived pellet consisting of a mixture of:
   (a) a refuse derived fluff within the range of about 89 wt. % to about 75 wt. % of the overall content of said mixture;
   (i) said fluff derived from cell dose-based municipal or industrial solid waste material;
   (ii) said fluff having an overall sulfur content of no more than about 0.5 wt. %; and
   (iii) said fluff having an overall water content within a range of about 10 wt. % to about 40 wt. %; and
   (b) calcium hydroxide within the range of about 11 wt. % to about 25 wt. % of the overall content of said mixture; said calcium hydroxide having a particle size within a range of about 0.5 mm to about 0.04 mm;
said mixture being densified and pelletized into a mechanically and biologically stable form.

10. The combustible pellet of claim 9, wherein: said product has a heating value of about 7000 BTU/lb.

11. The combustible pellet of claim 9, wherein: said product has a heating value of about 7500 BTU/lb.

12. A combustible pellet consisting of a mixture of:
   (a) a first component comprising a fraction of the overall content of said mixture within the range of about 89 wt. % to about 75 wt. %;
   (i) said first component derived from fluff cellulose-based municipal or industrial solid waste material having a density of less than about 2 lb./ft.$^3$ and a moisture content within the range of about 10 wt. % to about 40 wt. %; and
   (ii) said first component having an overall sulfur content of no more than about 0.5 wt. %;
   (b) a second component comprising a fraction of the overall content of said mixture within the range of about 11 wt. % to about 25 wt. %;
   (i) said second component being an alkaline earth metal hydroxide; and
   (ii) said second component having a particle size within a range of about 0.5 mm to about 0.04 mm;
said mixture having been densified and pelletized into a mechanically and biologically stable form having diameter within the range of 0.5 inch to 1 inch.

* * * * *